United States Patent
Leman et al.

(10) Patent No.: US 10,006,670 B2
(45) Date of Patent: Jun. 26, 2018

(54) METHOD FOR MANAGING A REFRIGERANT CHARGE IN A MULTI-PURPOSE HVAC SYSTEM

(71) Applicant: Carrier Corporation, Farmington, CT (US)

(72) Inventors: Derek Leman, Brownsburg, IN (US);
Matthew Austin, Indianapolis, IN (US);
Aaron M. Bright, Indianapolis, IN (US)

(73) Assignee: CARRIER CORPORATION, Farmington, CT (US)

( * ) Notice: Subject to any disclaimer, the term of this patent is extended or adjusted under 35 U.S.C. 154(b) by 696 days.

(21) Appl. No.: 14/249,652

(22) Filed: Apr. 10, 2014

(65) Prior Publication Data

US 2014/0326004 A1 Nov. 6, 2014

Related U.S. Application Data

(60) Provisional application No. 61/818,557, filed on May 2, 2013.

(51) Int. Cl.

| | |
|---|---|
| *F25B 29/00* | (2006.01) |
| *F25B 13/00* | (2006.01) |
| *F24D 17/02* | (2006.01) |
| *F24H 4/04* | (2006.01) |
| *F24H 4/06* | (2006.01) |

(Continued)

(52) U.S. Cl.
CPC .............. *F25B 13/00* (2013.01); *F24D 15/04* (2013.01); *F24D 17/02* (2013.01); *F24H 4/04* (2013.01); *F24H 4/06* (2013.01); *F24H 6/00* (2013.01); *F25B 41/04* (2013.01);

(Continued)

(58) Field of Classification Search
CPC ..... F24H 4/04; F24H 4/06; F24H 6/00; F24D 15/04; F24D 17/02; F25B 41/04; F25B 2313/003; F25B 2013/0233; Y02B 30/12
See application file for complete search history.

(56) References Cited

U.S. PATENT DOCUMENTS

| | | | |
|---|---|---|---|
| 3,304,742 | A | 2/1967 | Eisberg |
| 4,165,037 | A | 8/1979 | McCarson |

(Continued)

FOREIGN PATENT DOCUMENTS

| | | |
|---|---|---|
| CN | 201532012 | 7/2010 |
| DE | 19517053 | 11/1996 |

(Continued)

OTHER PUBLICATIONS

Byrne et al., Modelling and Simulation of a Heat Pump for Simultaneous Heating and Cooling, Jul. 19, 2012.

*Primary Examiner* — Kun Kai Ma
(74) *Attorney, Agent, or Firm* — Cantor Colburn LLP

(57) ABSTRACT

A method for managing a refrigerant charge in a system for heating water and conditioning an interior space by removing power from an indoor fan for a first duration of time prior to switching at least one valve to configure a second refrigerant circuit for satisfying a water heating demand. A method for managing a refrigerant charge in a system for heating water and conditioning an interior space by removing power from a water pump for a second duration of time prior to switching at least one valve to reconfigure a first refrigerant circuit to satisfy an interior space heating demand.

22 Claims, 2 Drawing Sheets

(51) Int. Cl.
  *F24H 6/00* (2006.01)
  *F24D 15/04* (2006.01)
  *F25B 41/04* (2006.01)

(52) U.S. Cl.
  CPC . *F25B 2313/003* (2013.01); *F25B 2313/0233* (2013.01); *Y02B 30/12* (2013.01)

(56) References Cited

U.S. PATENT DOCUMENTS

| | | | |
|---|---|---|---|
| 4,409,796 A | 10/1983 | Fisher | |
| 4,539,817 A | 9/1985 | Staggs et al. | |
| 4,592,206 A * | 6/1986 | Yamazaki | F24D 15/04 62/160 |
| 4,693,089 A | 9/1987 | Bourne et al. | |
| 4,893,476 A | 1/1990 | Bos et al. | |
| 5,249,436 A | 10/1993 | Hemsath | |
| 5,497,629 A * | 3/1996 | Rafalovich | F24D 11/0214 62/199 |
| 7,021,073 B2 * | 4/2006 | Sakakibara | F24D 19/1054 165/240 |
| 2006/0150652 A1 * | 7/2006 | Choi | F25B 13/00 62/238.6 |
| 2007/0234752 A1 * | 10/2007 | Otake | F25B 29/003 62/324.6 |
| 2008/0197206 A1 * | 8/2008 | Murakami | F25B 13/00 237/2 B |
| 2008/0264075 A1 * | 10/2008 | Seefeldt | F25B 1/10 62/81 |
| 2009/0013702 A1 * | 1/2009 | Murakami | F25B 13/00 62/118 |
| 2009/0049857 A1 * | 2/2009 | Murakami | F25B 13/00 62/324.6 |
| 2009/0173336 A1 | 7/2009 | Leifer et al. | |
| 2009/0211282 A1 * | 8/2009 | Nishimura | F24D 17/02 62/238.6 |
| 2009/0241573 A1 * | 10/2009 | Ikegami | B60H 1/00335 62/238.7 |
| 2010/0133464 A1 * | 6/2010 | Tomura | C09K 5/063 252/70 |
| 2010/0282435 A1 * | 11/2010 | Yabuuchi | F24D 17/0073 165/63 |
| 2011/0016897 A1 * | 1/2011 | Akagi | F24D 3/18 62/161 |
| 2011/0154848 A1 * | 6/2011 | Jin | F24D 3/18 62/324.6 |
| 2011/0197600 A1 * | 8/2011 | Hamada | F24H 4/04 62/79 |
| 2011/0283725 A1 * | 11/2011 | Sim | F24D 11/0214 62/151 |
| 2012/0180984 A1 * | 7/2012 | Fujitsuka | F24D 11/0214 165/61 |
| 2012/0204588 A1 * | 8/2012 | Takenaka | F25B 29/003 62/238.7 |
| 2013/0104574 A1 * | 5/2013 | Dempsey | F25B 29/003 62/79 |
| 2013/0160985 A1 * | 6/2013 | Chen | F25B 13/00 165/201 |
| 2013/0180266 A1 * | 7/2013 | Bois | F25B 30/02 62/56 |
| 2014/0033750 A1 * | 2/2014 | Tanaka | F25B 13/00 62/151 |
| 2014/0230477 A1 * | 8/2014 | Furui | F25B 5/04 62/238.6 |

FOREIGN PATENT DOCUMENTS

| | | |
|---|---|---|
| GB | 2431228 | 4/2007 |
| WO | 9427098 | 11/1994 |

* cited by examiner

METHOD FOR MANAGING A REFRIGERANT CHARGE IN A MULTI-PURPOSE HVAC SYSTEM

CROSS REFERENCE TO RELATED APPLICATIONS

The present application is related to, and claims the priority benefit of, U.S. Provisional Patent Application Ser. No. 61/818,557 filed May 2, 2013, the contents of which are hereby incorporated in their entirety into the present disclosure.

TECHNICAL FIELD OF THE DISCLOSED EMBODIMENTS

The presently disclosed embodiments generally relate to systems for heating water and conditioning an interior space, and more particularly, to a method for managing a refrigerant charge in a multi-purpose heating, ventilation, and air-conditioning (HVAC) system.

BACKGROUND OF THE DISCLOSED EMBODIMENTS

A typical water heater for residential hot water production and storage is an electrical resistance water heater and storage tank, although gas water heaters are also used to heat water in a storage tank. Water heaters typically include a storage tank defining a chamber for retention of water. A water inlet pipe is provided with a first connection for interconnection with a cold water supply line that conveys fresh, relatively cold water into the storage tank. In the case of electrical resistance water heaters, there are electrical resistance elements, within the storage tank, that heat the water.

An alternative method for heating water is an active desuperheater water heater. In one example of an active desuperheater water heater, the active desuperheater water heater uses a small pump to circulate water from a water storage tank, through a heat exchanger, and back into the water storage tank. The active desuperheater water heater intercepts the superheated hot gas that is rejected from an air conditioner or heat pump compressor, sitting outside the home, and transfers the heat to the water circulating through the heat exchanger. The active desuperheater water heater works only when the air conditioner or heat pump is operating in a cooling mode.

Another alternative method for heating water is a heat pump water heater. A heat pump water heater contains a fan, compressor, and an evaporator configured to sit on top of the water storage tank. The heat pump water heater circulates a refrigerant through an evaporator and compressor, and uses a fan and evaporator to pull heat from air surrounding the heat pump water heater in order to heat the refrigerant. The heated refrigerant runs through a condenser coil within the water storage tank, transferring heat to the water stored therein.

Yet another alternative method for heating water is a HVAC system coupled with a water heater module to form a multi-purpose system. This multi-purpose system utilizes a water heater module to divert a refrigerant to an indoor unit assembly when conditioning an interior space, or to the water heater module's heat exchanger when heating water. The outdoor heat pump circulates a refrigerant through an evaporator and compressor, and uses a fan and the evaporator to pull heat from air surrounding the heat pump in order to heat the refrigerant. The heated refrigerant runs through the water heater module heat exchanger, transferring heat to water also circulating through the water heater module heat exchanger.

During interior space cooling operation, 10-15% of the system refrigerant is typically contained within the indoor unit assembly. During interior space heating operation, 50-60% of the system refrigerant is typically contained within the indoor unit assembly. During water heating mode, the amount of system refrigerant present in the indoor unit assembly is approximately the same as during the interior space cooling mode. When the system switches from interior space cooling mode to water heating mode, there will be a sufficient amount of refrigerant charge available to the water heater module. If the valves are switched from interior space heating mode to water heating mode, there will be an insufficient amount of refrigerant charge available to the water heater module. Therefore, there is a need for a method to manage the refrigerant charge to provide a sufficient amount of refrigerant charge to a water heater module for optimal performance.

SUMMARY OF THE DISCLOSED EMBODIMENTS

In one aspect, a method for managing a refrigerant in a multi-purpose system for heating water and conditioning an interior space is provided. In one embodiment, the method includes the step of operating the system in a heating mode to condition an interior space, and operating at least one valve, disposed in the water heater module, to configure a first refrigerant circuit. For example, a first refrigerant circuit is established by a controller commanding at least one valve to be placed in an open state, and commanding at least one valve to be placed in a closed state. In one embodiment, the multi-purpose system circulates a refrigerant from an outdoor unit assembly through a water heater module, through an indoor unit assembly, and returns to the outdoor unit assembly.

The method includes the step of receiving a first signal at the water heater module. In one embodiment, a controller receives a wired or wireless signal from a water storage tank indicating when a water heating mode should be initiated. During a demand to heat water, the water storage tank sends a signal to the water heater module to operate in a water heating mode.

The method includes the step of removing power from an indoor fan for a first duration of time. In one embodiment, the first duration of time to remove power from the indoor fan is less than or equal to 30 seconds. In another embodiment, the first duration of time equals a time during which a sensor indicates a vapor is present within a conduit operably coupled to the outdoor unit assembly.

The method includes the step of operating at least one valve, disposed in the water heater module, to configure a second refrigerant circuit. For example, the second refrigerant circuit is established by the controller commanding at least one valve to be placed in an open state, and commanding at least one valve to be placed in a closed state. In one embodiment, the multi-purpose system circulates the refrigerant from the outdoor unit assembly through the water heater module, and returns to the outdoor unit assembly. The refrigerant will continue to circulate through the second refrigerant circuit until the water heating demand is satisfied.

The method includes the step of receiving a second signal at the water heater module. In one embodiment, the controller receives a wired or wireless signal from the water storage tank indicating when a water heating demand has been satisfied. Once the water heating demand has been satisfied, water storage tank sends a second signal to water heater module to stop operating in a water heating mode.

The method includes the step of removing power from a water pump, disposed within the water heater module, for a second duration of time. In one embodiment, the second duration of time to remove power from the water pump is less than or equal to 30 seconds. In another embodiment, the second duration of time equals a time during which a sensor indicates a vapor is present within a conduit operably coupled to the outdoor unit assembly.

The method includes the step of operating at least one valve to reconfigure the first refrigerant circuit. For example, after completion of the water heating demand, the controller commands at least one valve to be placed in an open state, and commands at least one valve to be placed in a closed state to reconfigure the first refrigerant circuit and resume the heating mode to condition an interior space.

In one aspect, a multi-purpose HVAC system for heating water and conditioning an interior space is provided. In one embodiment, the system includes an outdoor unit assembly, an indoor unit assembly including a fan, a water heater module including at least one valve and a pump, a plurality of conduits operatively coupling the pump to the outdoor unit assembly and the indoor unit assembly, and a controller operably coupled to the fan, the at least one valve and the pump wherein the controller is configured to operate the at least one valve to configure a first refrigerant circuit. In one embodiment, the controller configures the first refrigerant circuit to circulate a refrigerant from the outdoor unit assembly, through the water heater module, through the indoor unit assembly, and returns to the outdoor unit assembly.

In one embodiment, the controller is configured to operate the indoor unit assembly, the outdoor unit assembly, and the water heater module in a heating mode to condition an interior space. In one embodiment, the controller is configured to receive a first signal. In one embodiment, the first signal designates a demand to heat water.

In one embodiment, the controller is configured to remove power from the fan for a first duration of time. In one embodiment, the first duration of time is less than or equal to 30 seconds. In another embodiment, the first duration of time equals a time during which a sensor indicates a vapor is present within the outdoor unit assembly.

In one embodiment, the controller is configured to operate the at least one valve to configure a second refrigerant circuit. In one embodiment, the controller configuring the second refrigerant circuit to circulate a refrigerant from the outdoor unit assembly through the water heater module, and returns to the outdoor unit assembly.

In one embodiment, the controller is configured to operate the outdoor unit assembly and the water heater module in a water heating mode. In one embodiment, the controller is configured to receive a second signal. In one embodiment, the second signal designates a demand for heating water is satisfied.

In one embodiment, the controller is configured to remove power from the pump for a second duration of time. In one embodiment, the second duration of time is less than or equal to 30 seconds. In another embodiment, the second duration of time equals a time during which a sensor indicates a vapor is present within a conduit operably coupled to the outdoor unit assembly.

In one embodiment, the controller is configured to operate the at least one valve to reconfigure the first refrigerant circuit. In one embodiment, the at least one valve includes a pair of three way valves. In another embodiment, the at least one valve includes a first valve, a first conduit coupling the first valve to an inlet of the heat exchanger, a second valve, a second conduit coupling the second valve to an outlet of the heat exchanger, a third valve, a third conduit coupling the third valve to the first valve, a fourth valve, a fourth conduit coupling the fourth valve to the second valve, wherein the controller is configured to open the third and fourth valves and close the first and second valves to configure the first refrigerant circuit. In another embodiment, the at least one valve includes a first valve, a first conduit coupling the first valve to an inlet of the heat exchanger, a second valve, a second conduit coupling the second valve to an outlet of the heat exchanger, a third valve, a third conduit coupling the third valve to the first valve, a fourth valve, a fourth conduit coupling the fourth valve to the second valve wherein the controller is configured to open the first and second valves and close the third and fourth valves to configure the second refrigerant circuit.

BRIEF DESCRIPTION OF THE DRAWINGS

The embodiments and other features, advantages and disclosures contained herein, and the manner of attaining them, will become apparent and the present disclosure will be better understood by reference to the following description of various exemplary embodiments of the present disclosure taken in conjunction with the accompanying drawings, wherein.

DETAILED DESCRIPTION OF THE DISCLOSED EMBODIMENTS

Figure 1:
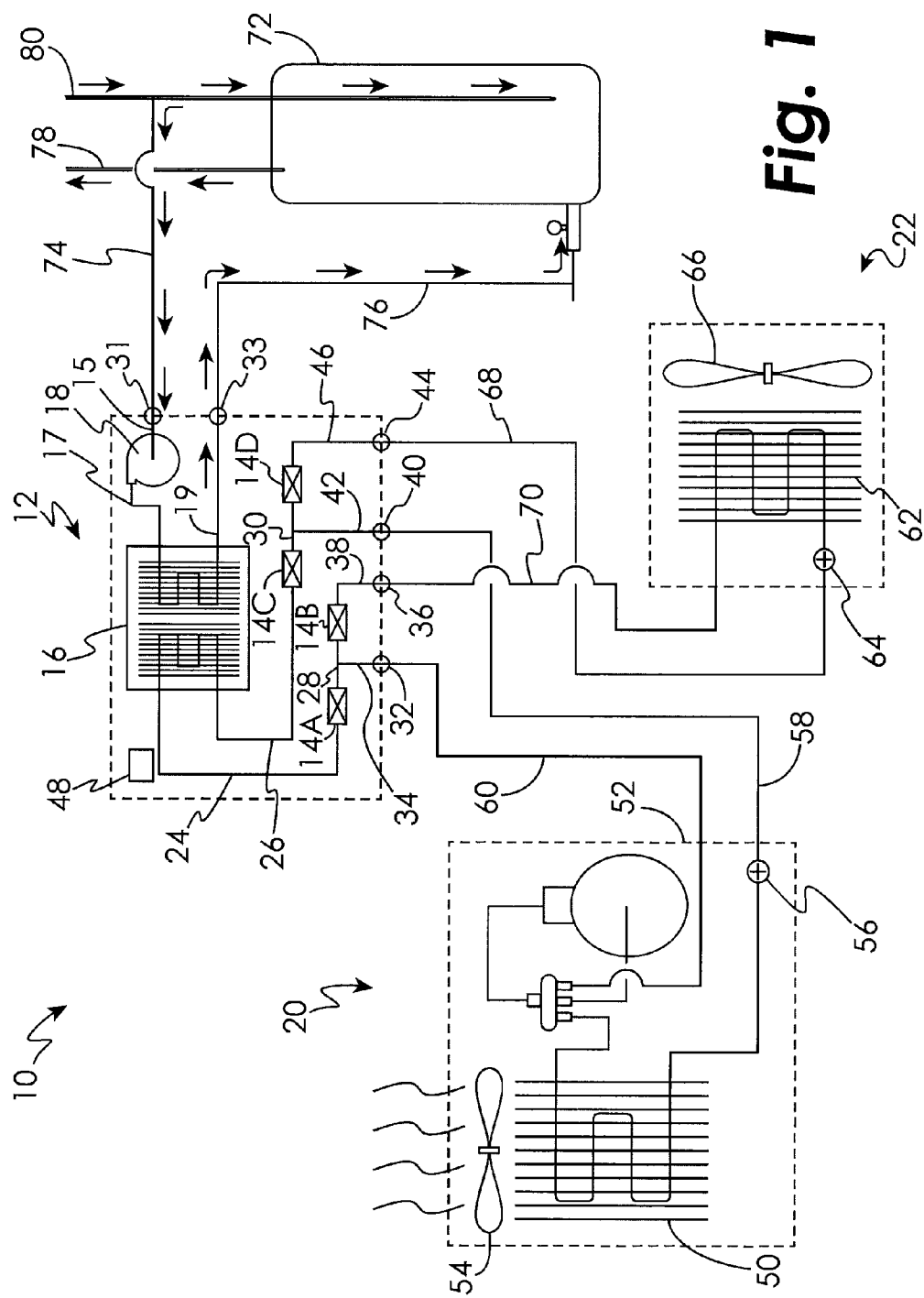
FIG. 1 is a schematic diagram of a system for heating water and conditioning an interior space in one embodiment.

For the purposes of promoting an understanding of the principles of the present disclosure, reference will now be made to the embodiments illustrated in the drawings, and specific language will be used to describe the same. It will nevertheless be understood that no limitation of the scope of this disclosure is thereby intended.

FIG. 1 illustrates a multi-purpose system for heating water and conditioning an interior space, utilizing an embodiment of the present disclosure, and indicated generally at 10. Particularly, the multi-purpose system 10 includes a water heater module 12, and an outdoor unit assembly 20 operably coupled to the water heater module 12. System 10 further includes an indoor unit assembly 22 operably coupled to the water heater module 12.

Water heater module 12 includes a heat exchanger 16, wherein the heat exchanger 16 allows a refrigerant to circulate therethrough. The water heater module 12 includes a plurality of valves 14A-D to direct the flow of the refrigerant therethrough. The refrigerant supply side inlet of heat exchanger 16 is coupled to valve 14A via a conduit 24. The refrigerant return side outlet of heat exchanger 16 is coupled to valve 14C via a conduit 26. A valve 14B is coupled to valve 14A via a conduit 28. A valve 14D is coupled to valve 14C via a conduit 30. The valves 14A and 14B are further coupled to an outdoor unit assembly supply connector 32 via a conduit 34. Valve 14B is further coupled to an indoor unit assembly supply connector 36 via a conduit 38. It will be appreciated that the valves 14A and 14B, together with the conduits 28, 34 and 38, function as a first three-way valve. The valves 14C and 14D are further coupled to an outdoor unit assembly return connector 40 via a conduit 42. Valve 14D is further coupled to an indoor unit assembly return connector 44 via a conduit 46. It will be appreciated that the valves 14C and 14D, together with the conduits 30, 42, and 46 function as a second three-way valve.

Water heater module 12 further includes a water pump 18 to draw water therein. Water pump 18 is coupled to a water supply connector 31 via a conduit 15. Water pump 18 is further coupled to heat exchanger 16 via a conduit 17. Water heater module 12 includes a water return connector 33, which is coupled to heat exchanger 16 via a conduit 19.

A controller 48 is operably coupled to each of the plurality of valves 14A-D for control thereof, for example by electrical communication with the valves 14A-D. Controller 48 is operably coupled to water pump 18 for control thereof, for example by electrical communication with the water pump 18. The controller 48 provides the water heater module 12 with a variety of operation modes and control sequences to execute instructions during one of an interior space conditioning mode or water heating mode.

Outdoor unit assembly 20 includes a second heat exchanger 50, a compressor 52, a fan 54, and an expansion device 56. Outdoor unit assembly 20 may be an air-to-air or ground source heat pump, to name just two non-limiting examples. Expansion device 56 of outdoor unit assembly 20 is coupled to the outdoor unit assembly return connector 40 via a conduit 58. Outdoor unit assembly 20 is coupled to the outdoor unit assembly supply connector 32 via a conduit 60.

Indoor unit assembly 22 includes a third heat exchanger 62, an expansion device 64, and an indoor fan 66. Indoor unit assembly 22 may be an air handler, to name one non-limiting example. Indoor unit assembly 22 is coupled to the indoor unit assembly return connector 44 via a conduit 68. Indoor unit assembly 22 is coupled to the indoor unit assembly supply connector 36 via a conduit 70.

Water heater module 12 is in communication with outdoor unit assembly 20 and indoor unit assembly 22 via a wired or wireless connection (not shown). Water heater module 12 operates to switch outdoor unit assembly 20 and indoor unit assembly 22 between an interior space conditioning mode and a water heating mode.

A water storage tank such as the tank 72 is designed to produce a signal to indicate when a water heating mode should be initiated. Water storage tank 72 is coupled to the water supply connector 31 via a conduit 74. Water storage tank 72 is further coupled to the water return connector 33 via a conduit 76. During a demand to heat water, water storage tank 72 sends a signal to water heater module 12 to operate in a water heating mode. Water heater module 12 sends a signal to outdoor unit assembly 20 to operate in a heating mode.

Figure 2:
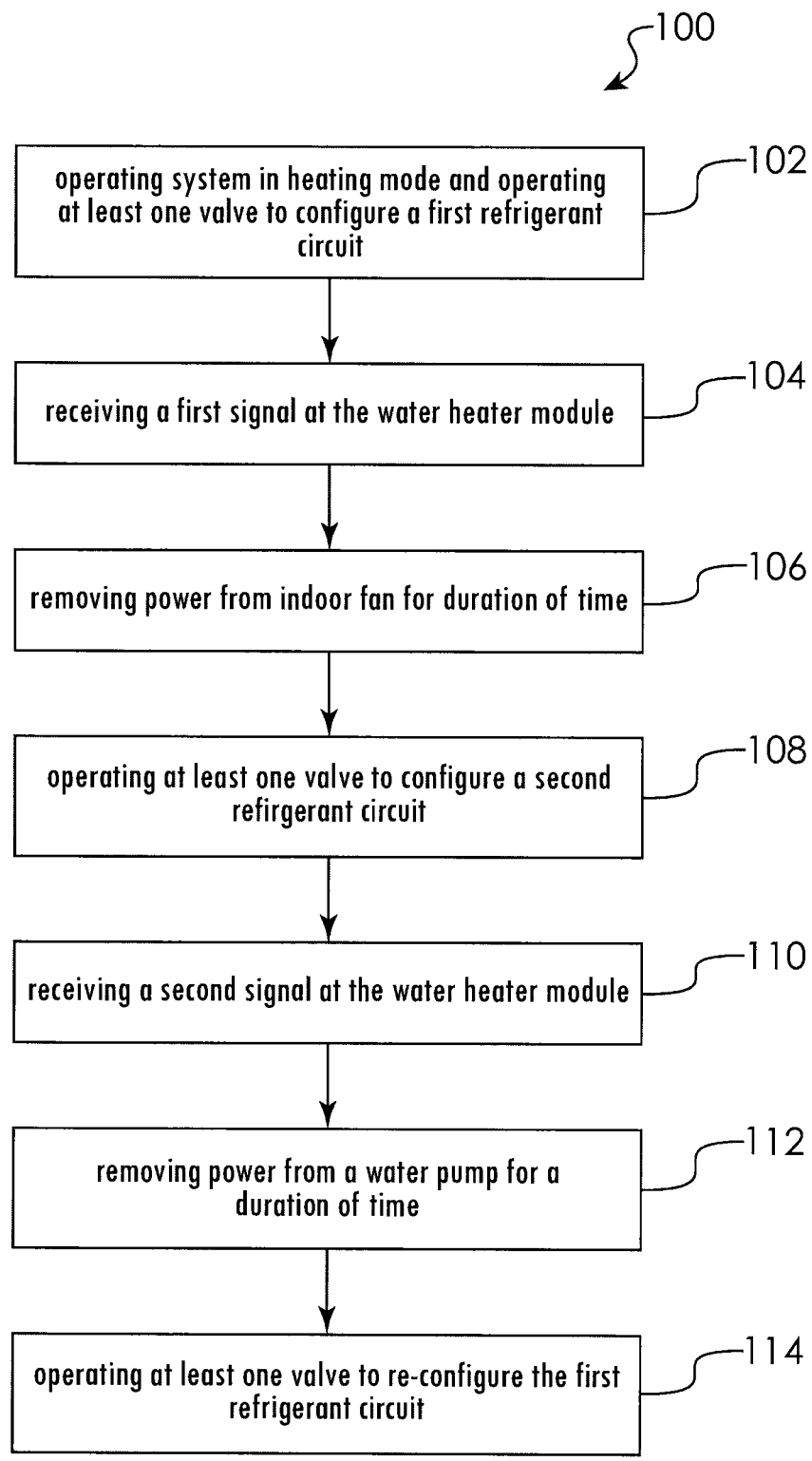
FIG. 2 is a method for managing a refrigerant for a system for heating water and conditioning an interior space in an exemplary embodiment.

FIG. 2 illustrates an exemplary method for managing a refrigerant in a multi-purpose system 10 for heating water and conditioning an interior space. As shown in FIG. 2, an exemplary method 100 includes the step 102 of operating the multi-purpose system 10 in a heating mode to condition an interior space, and operating at least one valve 14A-D disposed in the water heater module 12 to configure a first refrigerant circuit. For example, a first refrigerant circuit is established by controller 48 commanding valves 14B and 14D to be placed in an open state, and commanding valves 14A and 14C to be placed in a closed state. The multi-purpose system 10 operates in a heating mode when a signal is received from a sensor (not shown) positioned within an interior space. The signal indicates the actual temperature within the interior space is below the desired temperature set-point. The outdoor unit assembly 20 operates in a heating mode by circulating a refrigerant through second heat exchanger 50, compressor 52, and into conduit 60. The refrigerant enters the water heater module 12 through outdoor unit assembly supply connector 32 wherein the refrigerant is directed through valve 14B and exits through indoor unit assembly supply connector 36. The refrigerant enters indoor unit assembly 22, via conduit 70, and circulates through third heat exchanger 62. The refrigerant exits indoor unit assembly 22 through indoor expansion device 64 and enters conduit 68, then enters the water heater module 12 through indoor unit assembly return connector 44. The refrigerant is directed through valve 14D, and exits through outdoor unit assembly return connector 40. The refrigerant returns to outdoor unit assembly 20 via conduit 58. As the refrigerant circulates through the aforementioned first refrigerant circuit, indoor fan 66 operates to distribute air within the interior space. The refrigerant will continue to circulate through the first refrigerant circuit, and indoor fan 66 will continue to operate until the heating demand to condition an interior space is satisfied or until a demand to heat water is present.

Step 104 includes receiving a first signal at the water heater module 12. In one embodiment, controller 48 receives a wired or wireless signal from water storage tank 72 indicating when a water heating mode should be initiated. During a demand to heat water, water storage tank 72 sends a signal to water heater module 12 to operate in a water heating mode.

Step 106 includes removing power from the indoor fan 66 for a first duration of time. In one embodiment, the duration of time to remove power from indoor fan 66 is less than or equal to 30 seconds. In other embodiments, power may be removed from indoor fan 66 for more than 30 seconds. In another embodiment, the first duration of time equals a time during which a sensor (not shown) indicates a vapor is present within a conduit operably coupled to the outdoor unit assembly 20.

Step 108 includes operating at least one valve 14A-D, disposed in the water heater module 12, to configure a second refrigerant circuit. For example, the second refrigerant circuit may be established by controller 48 commanding valves 14A and 14C to be placed in an open state, and commanding valves 14B and 14D to be placed in a closed state. In one embodiment, outdoor unit assembly 20 operates by circulating a refrigerant through second heat exchanger 50, compressor 52, and into conduit 60. The refrigerant enters the water heater module 12 through outdoor unit assembly supply connector 32, wherein the refrigerant is directed through valve 14A and circulates through heat exchanger supply conduit 24. The refrigerant circulates through heat exchanger 16 and exits heat exchanger 16 via heat exchanger return conduit 26. The refrigerant is directed through valve 14C, and exits through outdoor unit assembly return connector 40. The refrigerant returns to outdoor unit assembly 20 via conduit 58. The refrigerant will continue to circulate through the second refrigerant circuit until the water heating demand is satisfied. Concurrently, water is drawn into water heater module 12 via water pump 18. Water exits water storage tank 72 via conduit 74, wherein it enters water heater module 12 through water supply connector 31 and conduit 15. Water passes through water pump 18 and enters heat exchanger 16 via conduit 17. As heat is transferred from the refrigerant to the water, the water exits heat exchanger 16 via conduit 19. The heated water exits water heater module 12 through water return connector 33 via a conduit 76, wherein the heated water is returned to water storage tank 72 to be available for use. During use, water exits water storage tank 72 via domestic supply line 78, and returns via domestic return line 80.

Step 110 includes receiving a second signal at the water heater module 12. In one embodiment, controller 48 receives a wired or wireless signal from water storage tank 72 indicating when a water heating demand has been satisfied. Once the demand to heat water has been satisfied, water storage tank 72 sends a second signal to water heater module 12 to stop operating in a water heating mode.

Step 112 includes removing power from water pump 18, disposed within the water heater module 12, for a second duration of time. In one embodiment, the second duration of time to remove power from water pump 18 is less than or equal to 30 seconds. In other embodiments, the second duration of time is greater than 30 seconds. In another embodiment, the second duration of time equals a time during which a sensor (not shown) indicates a vapor is present within a conduit operably coupled to the outdoor unit assembly 20.

Step 114 includes operating the at least one valve 14A-D to reconfigure the first refrigerant circuit. After the second duration of time has elapsed, controller 48 commands valves 14B and 14D to be placed in an open state, and commands valves 14A and 14C to be placed in a closed state to resume the heating mode to condition an interior space.

It will be appreciated that, because indoor fan 66 is turned off for a first duration of time prior to switching back to the second refrigerant circuit, the refrigerant will no longer condense and will stay in vapor form. The vapor will drive the remaining liquid refrigerant back into the outdoor unit assembly 20 where the liquid refrigerant will be available for use in a water heating mode. Additionally, because the water pump 18 is turned off for a second duration of time prior to switching back to the first refrigerant circuit, the refrigerant will no longer condense and will stay in vapor form. The vapor will drive the remaining liquid refrigerant back into the outdoor unit assembly 20 where the liquid refrigerant will be available for use in the heating mode to condition an interior space.

While the invention has been illustrated and described in detail in the drawings and foregoing description, the same is to be considered as illustrative and not restrictive in character, it being understood that only certain embodiments have been shown and described and that all changes and modifications that come within the spirit of the invention are desired to be protected.

What is claimed is:

1. A method for managing a refrigerant charge in a multi-purpose HVAC system including an outdoor unit assembly operably coupled to a water heater module, the water heater module including at least one valve, a heat exchanger, and a pump, the multi-purpose HVAC system further including an indoor unit assembly operably coupled to the water heater module and including a fan, the method comprising the steps of:
    (a) operating the at least one valve to configure a first refrigerant circuit;
    (b) operating the multi-purpose HVAC system in a heating mode to condition an interior space and not in a water heating mode;
    (c) receiving a first signal at the water heater module;
    (d) removing power from the fan for a first duration of time;
    (e) operating the at least one valve to configure a second refrigerant circuit;
    (f) operating the multi-purpose HVAC system in the water heating mode and not in the heating mode to condition the interior space;
    (g) receiving a second signal at the water heater module;
    (h) removing power from the pump for a second duration of time;
    (i) operating the at least one valve to reconfigure the first refrigerant circuit;
    (j) wherein the at least one valve comprises;
        a first valve coupled to an inlet of the heat exchanger via a first conduit;
        a second valve coupled to an outlet of the heat exchanger via a second conduit;
        a third valve coupled to the first valve via a third conduit;
        a fourth valve coupled to the second valve via a fourth conduit;
    (k) wherein step (a) and step (i) each comprise opening the third and fourth valves and closing the first and second valves.

2. The method of claim 1, wherein the first refrigerant circuit circulates the refrigerant from the outdoor unit assembly, through the water heater module, through the indoor unit assembly, and returns to the outdoor unit assembly.

3. The method of claim 1, wherein the first signal designates a demand to heat water.

4. The method of claim 1, wherein the first duration of time is less than or equal to 30 seconds.

5. The method of claim 1, wherein the first duration of time equals a time during which a sensor indicates a vapor is present within a conduit operably coupled to the outdoor unit assembly.

6. The method of claim 1, wherein the second refrigerant circuit circulates the refrigerant from the outdoor unit assembly through the water heater module, and returns to the outdoor unit assembly.

7. The method of claim 1, wherein the second signal designates a demand for heating water is satisfied.

8. The method of claim 1, wherein the second duration of time is less than or equal to 30 seconds.

9. The method of claim 1, wherein the second duration of time equals a time during which a sensor indicates a vapor is present within a conduit operably coupled to the outdoor unit assembly.

10. The method of claim 1, wherein the at least one valve comprises a pair of three way valves.

11. The method of claim 1,
    wherein step (e) comprises opening the first and second valves and closing the third and fourth valves.

12. A multi-purpose HVAC system comprising an outdoor unit assembly;
    an indoor unit assembly including a fan;
    a water heater module including at least one valve, a heat exchanger, and a pump;
    a plurality of conduits operatively coupling the heat exchanger to the outdoor unit assembly and the indoor unit assembly;
    wherein the at least one valve comprises:
        a first valve;
        a first conduit coupling the first valve to an inlet of a heat exchanger; a second valve;
        a second conduit coupling the second valve to an outlet of the heat exchanger; a third valve;

a third conduit coupling the third valve to the first valve; a fourth valve;

a fourth conduit coupling the fourth valve to the second valve; and a controller operably coupled to the fan, the at least one valve and the pump;

wherein the controller is configured to:
(a) operate the at least one valve to configure a first refrigerant circuit by opening the third and fourth valves and closing the first and second valves;
(b) operate the indoor unit assembly, the outdoor unit assembly, and the water heater module in a heating mode to condition an interior space and not in a water heating mode;
(c) receive a first signal;
(d) remove power from the fan for a first duration of time;
(e) operate the at least one valve to configure a second refrigerant circuit;
(f) operate the outdoor unit assembly and the water heater module in a water heating mode and not in the heating mode to condition the interior space;
(g) receive a second signal;
(h) remove power from the pump for a second duration of time; and
(i) operate the at least one valve to reconfigure the first refrigerant circuit.

13. The multi-purpose HVAC system of claim 12, wherein the controller configures the first refrigerant circuit to circulate a refrigerant from the outdoor unit assembly, through the water heater module, through the indoor unit assembly, and returns to the outdoor unit assembly.

14. The multi-purpose HVAC system of claim 12, wherein the first signal designates a demand to heat water.

15. The multi-purpose HVAC system of claim 12, wherein the first duration of time is less than or equal to 30 seconds.

16. The multi-purpose HVAC system of claim 12, wherein the first duration of time equals a time during which a sensor indicates a vapor is present within the outdoor unit assembly.

17. The multi-purpose HVAC system of claim 12, wherein step (e) comprises the controller configuring the second refrigerant circuit to circulate a refrigerant from the outdoor unit assembly through the water heater module, and returns to the outdoor unit assembly.

18. The multi-purpose HVAC system of claim 12, wherein the second signal designates a demand for heating water is satisfied.

19. The multi-purpose HVAC system of claim 12, wherein the second duration of time is less than or equal to 30 seconds.

20. The multi-purpose HVAC system of claim 12, wherein the second duration of time equals a time during which a sensor indicates a vapor is present within a conduit operably coupled to the outdoor unit assembly.

21. The multi-purpose HVAC system of claim 12, wherein the at least one valve comprises a pair of three way valves.

22. The multi-purpose HVAC system of claim 12, wherein the controller is configured to open the first and second valves and close the third and fourth valves to configure the second refrigerant circuit.

* * * * *